Patented Jan. 27, 1948

2,434,987

UNITED STATES PATENT OFFICE 2,434,987

CHOCOLATE COATED EDIBLES

Henry Russell Burbank, New York, and Benjamin J. Zenlea, Ozone Park, Long Island, N. Y., assignors to Rockwood & Co., Brooklyn, N. Y., a corporation of Delaware No Drawing. Applicat'on July 20, 1945,
Serial No. 606,268

5 Claims. (Cl. 99—138)

This invention relates to the manufacture of chocolate coated edibles.

In the manufacture of chocolate for use as chocolate coating material for chocolates, candy, ice cream bars and other edibles, chocolate liquor containing at least 50% of cocoa butter is blended with various ingredients such as sugar, additional cocoa butter, lecithin, flavoring materials and in some cases with milk solids, such as whole milk solids, or skim milk solids or buttermilk solids depending upon the type of chocolate coating desired. The chocolate material containing the chocolate liquor and some or all of the other ingredients, except the added cocoa butter, is first mixed or blended and then refined by a grinding process. The consistency of the refined material may vary from that of a powder to that of a heavy pasty or doughy mass. In order to enable the chocolate coating material to be applied to the cores or centers of the chocolates or other edibles by the usual dipping process including machine dipping, known as enrobing, the coating material must possess sufficient fluidity and for this purpose a suitable quantity of cocoa butter is added to the refined chocolate material. Usually sufficient cocoa butter is added to the refined chocolate material so that the chocolate coating material has a viscosity of about 450° to 10° MacMichael at the viscosity testing temperatures of about 90° to about 130° F. This requires the addition of about 10% to 80% cocoa butter resulting in a chocolate coating material having a total cocoa butter content of from about 35% to about 60%.

Chocolate coating materials having said proportions of from about 35% to 60% of cocoa butter and having said viscosities of from 450° to 10° MacMichael are used commercially for coating edibles such as chocolate or other confectionery centers, crackers, ice cream bars and other edible products. Due however to the low viscosity and high cocoa butter content of this chocolate coating material, the coatings on the edibles melt or soften readily under the influence of heat, and when the chocolate coating subsequently resolidifies upon cooling, it acquires a streaked or gray appearance known as "blooming."

The primary object of the present invention is to produce edibles having chocolate coatings which will resist softening under the influence of heat and to substantially reduce graying or bloom due to the effect of heat. More particularly, the chocolate coatings produced on the edibles in accordance with the present invention are of such character that they do not melt sufficiently to run at temperatures of about 100° F. to about 120° F. and do not melt at such temperatures to such an extent as to produce blooming thereof.

Considered more specifically, one of the objects of the present invention is to increase the viscosity and lower the cocoa butter content of the dip-applied chocolate coating on the core or center of the edible whereby to accomplish the above mentioned primary objects of this invention. More particularly and in accordance with this specific object of the invention, the chocolate coating on the core or center of the edible is of such character that it has a total cocoa butter content of about 23% to 28% and a viscosity of about 2000° to 5000° MacMichael at temperatures of about 90° F. to 130° F.

These and other objects of the invention, which might hereinafter appear are accomplished in the manner hereinafter described.

In accordance with the present invention, the edible product is coated with chocolate of the ordinary commercial type and in the usual way, that is by dipping the core or center of the edible in the chocolate coating material having sufficient cocoa butter to render the chocolate coating material fluid at the dipping temperatures, and thereafter solid edible material which is either free of cocoa butter or other fat or has a sufficiently small proportion of cocoa butter or other fat is incorporated in the chocolate coating in distributed absorbed relation therein, whereby the proportion of cocoa butter in the composite coating is less than the proportion of the cocoa butter in the chocolate coating material applied to the edible by the dipping process and whereby the viscosity of the resultant or composite coating on the edible is increased. It will be understood that the term dipping applies not only to the coating process in which the products are immersed, usually by hand, in the liquid chocolate coating, but also to the machine dipping process in which a machine known as an "enrober" is used and in which the liquid chocolate coating material is sprayed onto the chocolate or other confectionery centers. For convenience in reference, the chocolate coating which is applied by the dipping process, will sometimes be referred to as the primary coating without necessarily signifying that it is the first coating. Also, for convenience in reference, this material of low-fat content or having no fat content added to the primary coating will be referred to at times as dry material.

The quantity of dry or low fat material added to the primary chocolate coating after the latter is applied to the edible by the dipping operation, may vary within wide limits depending upon various factors such as the amount of chocolate in the primary coating material, the cocoa butter or fat content and viscosity of the primary chocolate coating material, the character of the dry material added to the primary chocolate coating, and the fat content of the added or dry material.

In accordance with the preferred mode of practicing our invention, the dry material added to the primary chocolate coating, formed by the dipping operation, consists of a mixture of finely ground cocoa powder and sugar. The fat content of the cocoa powder may vary from about 1% to 22%. We prefer to use cocoa having a cocoa butter content of 12% because commercial cocoa contains this percentage of cocoa butter. While cocoa containing a lower fat content would be more desirable because less cocoa would be required to reduce the proportion of cocoa butter in the resultant coating on the edible, the use of such cocoa of lower butter content is not feasible because for producing such cocoa special processing, such as prolonged pressing or solvent extraction of the cocoa butter, is required. The sugar and cocoa which is added to the chocolate coating in accordance with the present invention may be mixed in any suitable proportions but preferably in the same proportion as that of the cocoa solids and sugar present in the chocolate coating material applied by the dipping operation.

The edible constituent added to the dip applied or primary chocolate coating on the edible, in accordance with the present invention, need not be a mixture of cocoa and sugar but can consist of other materials. For example, instead of the mixture of cocoa and sugar, the added edible confectionery constituent can consist of either cocoa powder alone or of sugar alone. The sugar, whether used as an ingredient of the edible added constituent together with cocoa powder or as the sole ingredient of said added edible constituent may be either pulverized, finally crystallized, spray dried, or in any other form suitable for dusting onto the dip-applied chocolate coating material. When the dip-applied or primary chocolate coating material includes milk solids, such as whole milk solids, skim milk solids, buttermilk solids, etc., the dry or low fat material added to the primary coating material on the edible may comprise a quantity of milk solids, and in such case it is preferred that the proportion of milk solids in the added dry material be substantially the same as the proportion of the milk solids in the primary chocolate coating material unless said primary chocolate coating material is initially compounded to compensate for the quantity of milk solids applied as an ingredient of the added edible constituent. Similarly, when the dry or added edible constituent consists only of sugar, it is preferred to decrease the portion of sugar in compounding the primary chocolate coating material utilized in the dip coating operation, depending upon the desired characteristic, as to sweetness, of the composite or resultant chocolate coating on the edible.

The quantity of dry material added to the dip-applied chocolate coating material on the edible depends upon the total fat and viscosity of the dip applied chocolate coating material and the fat content of said dry material. In general, the quantity of dry material is such, having regard to its fat content, that the composite or resultant coating on the edible has a total fat content of from about 23% to 28% and a viscosity of about 2000° to 5000° MacMichael at the viscosity testing temperature of about 90° F. to 103° F., whereby the final or resultant coating on the center or core of the edible will not melt or run at temperatures of from about 100° F. to about 120° F. It is to be understood however that the present invention is not limited to these proportions of cocoa butter or to viscosities of these specific values, it being within the scope of the present invention to provide any desirable fat or viscosity characteristic such that the fat content in the resultant coating material is lower than that of the dip-applied chocolate coating material and such that the viscosity of the resultant coating material on the edible is higher than that of the chocolate coating applied by the dipping operation.

The following is a preferred specific example of practicing the method of the present invention, it being understood however that this example is given by way of illustration and is not to be construed as being in any way limitative of the present invention. The chocolate coating material for the primary coating, i. e., for application to the cores or centers of the edibles by the dip coating process preferably has the following composition:

| | Pounds |
|---|---|
| Chocolate liquor | 38 |
| Sugar | 47 |
| Added cocoa butter | 15 |

In the above primary chocolate-coating composition, the chocolate liquor has such proportion of fat (cocoa butter), that the total cocoa butter or fat content, including the added cocoa butter, is 35%, and the viscosity of the composition is about 300° MacMichael at the viscosity testing temperature of about 90° F. to 130° F. This chocolate coating material in liquid form is applied in the usual manner by means of an enrober or in any other suitable way to the chocolate centers or to the centers of other edibles.

The dry material, i. e., the material added to the primary or dip-applied chocolate coating on the edible, consists of a mixture of cocoa powder and finely pulverized sugar in the following proportions:

| | Pounds |
|---|---|
| Cocoa powder of 12% cocoa butter content | 20 |
| Sugar, finely pulverized | 30 |

This mixture which in this example constitutes the dry material is applied to the primary chocolate coating on the edible while said primary coating is in melted or liquid condition on the edible at a temperature of approximately 88° F. to 93° F. The dry material is heated to a temperature of about 88° F. to 93° F. before it is applied and is preferably applied, while at this temperature, to the primary coating. The dry material is applied to the dip-applied or primary chocolate coating on the edible in the proportion of 50 pounds of the dry material to 100 pounds of the primary chocolate-coating composition.

The dry material is applied to the primary chocolate coatings on the edibles in any suitable way, for example, by dusting, spraying or sieving said material as uniformly as possible on the dip-applied chocolate coatings on the edibles. The mixture of cocoa and sugar thus dusted or otherwise applied to the primary coating of chocolate material is thus distributed substantially uniformly throughout the coating, the particles of cocoa and sugar thus added being wetted by the cocoa butter in the primary coating of the chocolate material. Preferably, the chocolate covered edibles are shaken or vibrated to improve the absorption and dispersion of the particles of cocoa powder and sugar in the primary chocolate coating. After the dry material is added to the primary chocolate coating, the chocolate covered product is transferred to a cooling chamber, as in the usual method of producing chocolate coated edibles, whereby the chocolate coating becomes solidified or hardened on the center or core of the edible.

The final composite or resultant coating on the edible produced as described in this specific example of practicing the present invention has a cocoa butter content of approximately 26% and a viscosity of approximately 3000° Mac-Michael at the viscosity testing temperature of about 90° F. to 130° F.

It will be understood that various changes may be made in the method of practicing the present invention without departing from the underlying idea or principles of the invention with the scope of the appended claims.

Having thus described our invention, what we claim and desire to secure by Letters Patent is:

1. The method of making chocolate coated edibles which comprises applying to the center of the edible a coating of melted chocolate coating material containing a predetermined proportion of cocoa butter, and thereafter incorporating in said coating in distributed absorbed relation therein an edible solid material selected from the group consisting of cocoa, sugar, milk solids, and mixtures thereof, and which is proportionately lower in cocoa butter content than said first mentioned coating material whereby the proportion of cocoa butter in the composite coating is less than the proportion of cocoa butter in said first mentioned coating.

2. The method of making chocolate coated edibles which comprises applying to the center of the edible a coating of melted chocolate coating material containing a predetermined proportion of cocoa butter, and thereafter incorporating in said coating in distributed absorbed relation therein an edible solid material which comprises cocoa powder and which is proportionately lower in cocoa butter content than said first mentioned coating material whereby the proportion of cocoa butter in the composite coating is less than the proportion of cocoa butter in said first mentioned coating.

3. The method of making chocolate coated edibles which comprises applying to the center of the edible a coating of melted chocolate coating material containing a predetermined proportion of cocoa butter, and thereafter incorporating in said coating in distributed absorbed relation therein an edible solid material which comprises sugar and which is proportionately lower in cocoa butter content than said first mentioned coating material whereby the proportion of cocoa butter in the composite coating is less than the proportion of cocoa butter in said first mentioned coating.

4. The method of making chocolate coated edibles which comprises applying to the center of the edible a coating of melted chocolate coating material containing a predetermined proportion of cocoa butter, and thereafter incorporating in said coating in distributed absorbed relation therein an edible solid material which comprises milk solids and which is proportionately lower in cocoa butter content than said first mentioned coating material whereby the proportion of cocoa butter in the composite coating is less than the proportion of cocoa butter in said first mentioned coating.

5. The method of making chocolate coated edibles which comprises applying to the center of the edible a coating of melted chocolate coating material containing a predetermined proportion of cocoa butter, and thereafter and while the coating material is in melted condition applying thereto solid edible material in fluent form and distributed substantially throughout the coating, said fluent edible material comprising cocoa and being proportionately lower in cocoa butter content than said first mentioned coating material whereby the proportion of cocoa butter in the composite coating is less than the proportion of cocoa butter in said first mentioned coating.

H. RUSSELL BURBANK.
BENJAMIN J. ZENLEA.

REFERENCES CITED

The following references are of record in the file of this patent:

UNITED STATES PATENTS

| Number | Name | Date |
|---|---|---|
| 426,506 | Kuhn | Apr. 29, 1890 |
| 1,894,677 | Esmond et al. | Jan. 17, 1933 |
| 2,336,346 | Carver | Dec. 7, 1943 |

FOREIGN PATENTS

| Number | Country | Date |
|---|---|---|
| 496,936 | Great Britain | Dec. 8, 1938 |